United States Patent [19]
Gross et al.

[11] Patent Number: 5,864,481
[45] Date of Patent: Jan. 26, 1999

[54] INTEGRATED, RECONFIGURABLE MAN-PORTABLE MODULAR SYSTEM

[75] Inventors: Michael D. Gross, Woodland Hills, Calif.; Dennis Carlson, Bloomfield Hills, Mich.; Rohinton P. Billimoria, El Segundo; Douglas G. Turley, Ontario, both of Calif.

[73] Assignee: Raytheon Company, El Segundo, Calif.

[21] Appl. No.: 589,808

[22] Filed: Jan. 22, 1996

[51] Int. Cl.⁶ .................................................. G06F 1/16
[52] U.S. Cl. ............................. 364/400; 361/683
[58] Field of Search ............................. 701/1, 213, 217, 701/207; 364/550, 400; 345/7, 8; 361/683, 686; 356/251

[56] References Cited

U.S. PATENT DOCUMENTS

| | | | |
|---|---|---|---|
| 3,843,969 | 10/1974 | George et al. | 2/2.5 |
| 4,977,509 | 12/1990 | Pitchford et al. | 701/207 |
| 5,005,213 | 4/1991 | Hanson et al. | 455/617 |
| 5,059,781 | 10/1991 | Langdon | 250/206.1 |
| 5,272,514 | 12/1993 | Dor | 356/251 |
| 5,281,957 | 1/1994 | Schoolman | 345/8 |
| 5,386,371 | 1/1995 | Mather et al. | 364/550 |
| 5,450,596 | 9/1995 | Felsenstein | 345/8 |
| 5,515,070 | 5/1996 | Kawada | 345/8 |
| 5,555,490 | 9/1996 | Carroll | 361/686 |
| 5,572,401 | 11/1996 | Carroll | 361/683 |
| 5,583,776 | 12/1996 | Levi et al. | 701/217 |

FOREIGN PATENT DOCUMENTS

| | | |
|---|---|---|
| 545 527 A1 | 10/1992 | European Pat. Off. |
| 90/12330 | 10/1990 | WIPO |
| 93/19414 | 3/1993 | WIPO |
| 95/16948 | 12/1994 | WIPO |

*Primary Examiner*—Gary Chin
*Attorney, Agent, or Firm*—Leonard A. Alkov; William C. Schubert; Glenn H. Lenzen, Jr.

[57] ABSTRACT

There is described an integrated reconfigurable man-portable communication system, adapted particularly for use in military or law enforcement tactical situations, including a modular compact computer with mission oriented hardware and software which provides the focal point for integration of various peripheral systems. The reconfigurable man-portable system provides a ballistic helmet with an integrated audio headset assembly. The helmet also includes a modular heads-up display assembly for providing remote viewing via a helmet mounted laser detection system, weapon mounted thermal weapons site, remote video system, and laser range finder/digital compass assembly. The heads-up display assembly and the audio headset assembly provides the user with tactical information such as; 360 degree laser detection from helmet mounted detectors, target location for direct and indirect target engagement from the weapon mounted laser range finder/digital compass assembly, and navigational positioning from a global positioning system and individual radio module integrated within a modular load carrying device. The integration and modularity of the man-portable system provides a flexible, mission oriented system capable of providing the user with enhanced awareness and communications ability.

18 Claims, 6 Drawing Sheets

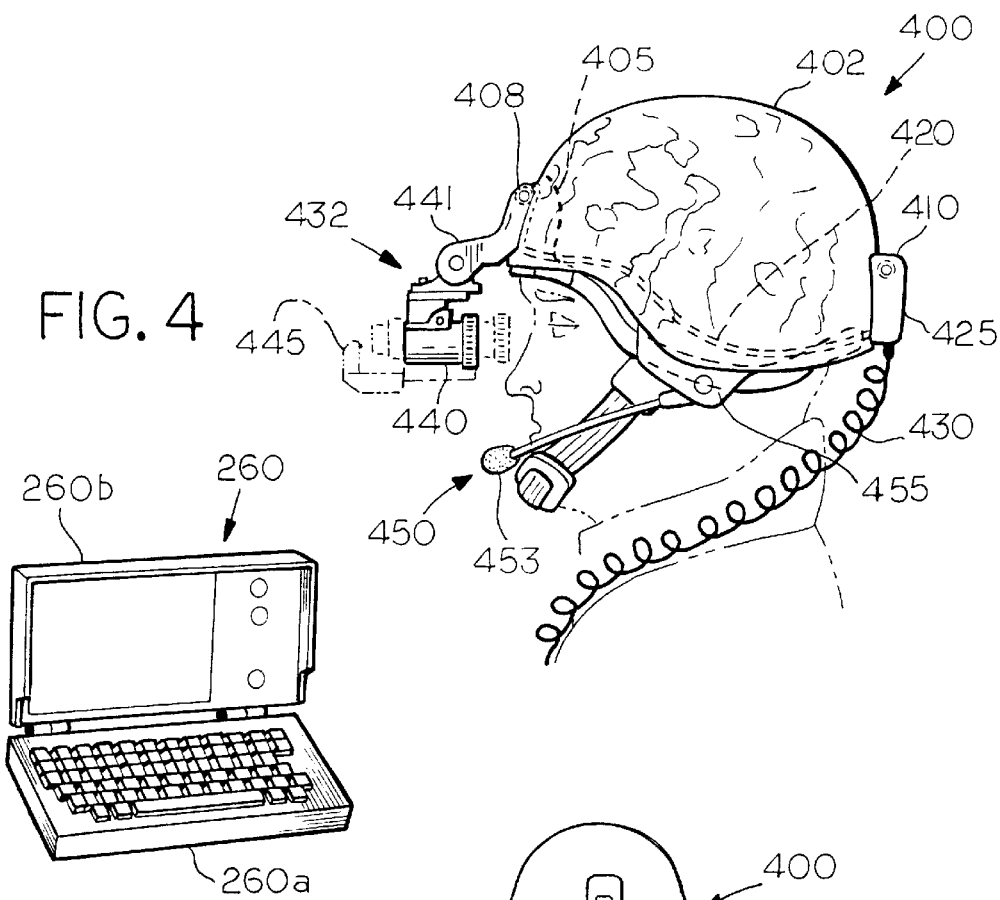
FIG. 4
FIG. 4a
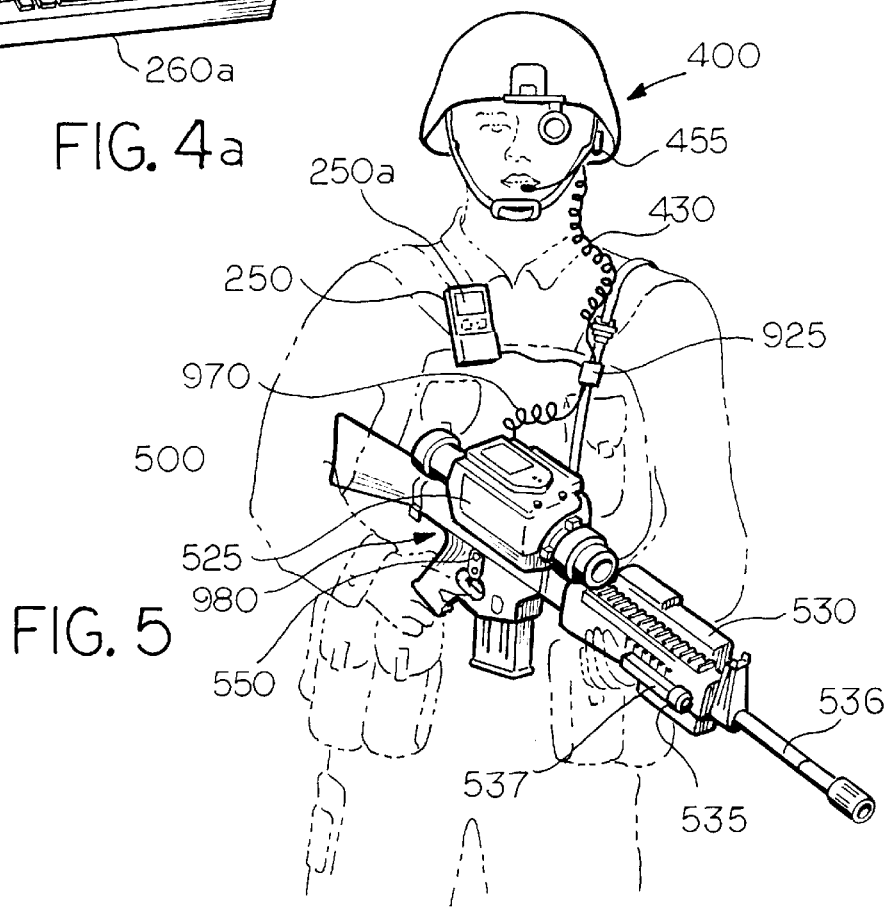
FIG. 5

INTEGRATED, RECONFIGURABLE MAN-PORTABLE MODULAR SYSTEM

BACKGROUND OF THE INVENTION

This invention relates generally to an integrated, reconfigurable man-portable modular system.

Modern technology, especially computers and electronics, have advanced rapidly in the recent past. Accordingly, it would be advantageous to apply these technological advances to the art of war. More particularly, it would be advantageous to apply the technological advances to weapons and other equipment designed to help the modern soldier function better in battlefield situations and increase their chances for survival.

Historically, foot soldiers also referred to as "Land Warriors" (LW), have sustained a relatively large percentage of all combat casualties. Traditionally, the soldier's survivability has been based on the soldier's individual ability to carry independent components such as clothing, ammunition navigational equipment, communication equipment, and firearms during battlefield maneuvers. The challenge facing the modern military involves finding the best way to improve the lethality, survivability, mobility, and communications capabilities of these LWs while keeping them immediately responsive and flexible enough to operate in an uncertain and frequently chaotic environment.

One approach used to meet these challenges is to view the soldier as an integral part of a complex system capable of providing the soldier with the ability of real-time situational awareness and advanced communications capability. To assist in the aforementioned problem, this invention provides an enhanced vision, communications, weapons and control interface system, hereinafter referred to as the LW system. The LW system is a modular, soldier-centered individual fighting system which increases the soldier's operational effectiveness while providing protection against multiple hazards on the battlefield. The LW system integrates state-of-the-art technological components into a cohesive, Light weight, cost-effective system that provides the soldier with advanced capabilities in the battlefield.

At the core of the LW system is a modular compact computer which incorporates component capabilities and controls the LW electrical systems through mission oriented hardware and software. The LW system incorporates a ballistic helmet with a modular heads-up display which provides remote viewing via a thermal weapons site, weapon mounted video camera, and a helmet mounted night-vision image intensifier and laser detection system. The LW system includes individual radios for soldier to soldier communication within the squad and leader(s) and/or for communication to Command Center(s). The computer, radios and other electrical components are mounted within a contoured low profile backpack, a.k.a. load carrying equipment (LCE), and a remote earphone and microphone for hands free operation are built into the helmet assembly.

The LCE provides the backbone for the integration of the LW system components and support for the soldier's pack load. The LCE is fully adjustable providing a one-size fits all frame and can carry a plurality of modular load packs. The load packs can be attached to the frame in various combinations for unique mission requirements and can be quickly removed from the LCE frame via an integrated quick release mechanisms.

Several high tech components mounted on the soldier's weapon enhances tactical capabilities. For example, the laser rangefinder/digital compass assembly provides precise target location for direct and indirect target engagement. A thermal sight and video camera are used to view targets on the heads-up display thereby allowing the soldier to acquire or engage targets with minimum exposure to a battlefield threat. The LW system soldiers can determine their position and navigate by using an integrated global positioning system and the computer/radio system. The laser range finder/digital compass assembly can also be used for determining position and for navigation in the absence of the global positioning system information (in the event of no satellite coverage or global positioning system failure).

An important design feature of the LW system is the modularity of the components which provides the flexibility to enhance soldier comfort and mobility, and also makes maintenance tasks easier to perform. An additional feature of the system is an integrated wiring harness and connector system embedded within the LCE which provides protection from inadvertent disconnection and snagging; minimizing weight, and adding to the system's ruggedness, and ultimately mobility and comfort of the soldier.

SUMMARY OF THE INVENTION

The present invention provides an innovative and improved vision and communication Land Warrior (LW) system. The LW system is an integrated man-portable modular system capable of providing a soldier with real-time situational awareness and advanced communications capability. The modular system includes a plurality of reconfigurable modular subsystems, a load carrying equipment for carrying the subsystems by the soldier as an integrated unit and facilitating flow of information between the subsystems and the soldier, and a data control device for operatively processing and controlling the flow of information between the subsystems and the soldier.

The LW system may be employed for relatively large or individualized applications such as in the military, law enforcement agencies, and the like. The LW system is modular at multiple levels for mission tailoring and also for easy insertion of future technological enhancements.

The LW system maximizes mission performance by increasing mobility, lethality, and survivability. The soldier is the foundation of the fully integrated LW system design. In addition to the soldier, the LW system has five subsystems; the Integrated Helmet Assembly (IHAS), Computer/Radio (CRS), the Weapon (WS), the Protective Clothing and Individual Equipment (PCIES), and the Software (SS). The LW system provides a seam-less integration of the above mentioned subsystems in a functionally packaged design to assure the soldier can handle physical and cognitive demands presented in the battlefield resulting in greater mission capability, combat effectiveness and survivability.

The integrated helmet assembly subsystem includes an integrated monocular heads-up display for all the information the soldier needs to successfully complete a mission. Battlefield information such as maps, combat graphics, friendly and enemy position, threat detection, target range and angle, and weapon sight viewing are all controlled by the soldier. The integrated helmet assembly design incorporates a ballistic helmet, suspension/retention assembly, microphone, speaker, laser detectors, and day/night sight displays.

The computer/radio subsystem is built on a plug-in, plug-out PCMCIA circuit card architecture and is thereby highly modular, reliable and can be updated to meet current technological advances. Imbedded within the load carrying equipment (LCE), the computer/radio subsystem effectively controls data flow by controlling radio broadcast, weapons interfaces, and sensor display.

The weapons subsystem provides an array of sensors at the soldier's fingertips. The live video camera, infrared light, laser rangefinder/digital compass, thermal weapons sight and close combat optics integrated on the soldier's weapon allows the soldier to more effectively designate and hit targets.

The protective clothing and individual equipment subsystem provides a one size fits all load carrying equipment which fully integrates the torso segment of the wiring harness leaving none of the harness exposed. The LW body armor is integrated with the load carrying equipment and provides a side opening armor vest. The side opening design allows for ventilation, heat stress reduction, easy access to battlefield uniform pockets and, when required, medical access. The vest also includes a side opening front and rear plate pocket for receiving a ballistic plate for increased protection.

The LCE functions as a platform for the communication between the modular components of the LW system. The load carried by the LCE is designed to be close to the center of gravity of the wearer's body and be distributed between shoulder and the hips, thus improving the soldiers comfort and mobility. The protective clothing and individual equipment subsystem also incorporates modular load packs which can be added or removed from the ICE allowing mission tailoring without the burden of wearing/carrying items unnecessary to the mission.

The software subsystem when running of the computer CPU provides the enhanced functionality of the LW system. Software for the LW system consists of three computer software configuration items: System software, Application software, and Mission Data Support software. The System software may be used to tailor the LW operating system to the Military or Law Enforcement common operating environment. In addition, the system software provides the top level control/interface with the LW components, data handling and dissemination, system diagnostic and status, power management, and on line help features. The Application software provides the core battlefield capabilities such as a digitized map display, command and control massaging, video imaging processing, individual and unit fire coordination, mission planning, and location/navigation display. The Mission Data Support software supports the preparation of removable memory modules and extraction of data from mission logs generated during operation of the LW system.

The LW system provides total integration of the soldier with electronic components, individual equipment, weaponry, and hazard protection. Particular object and advantages of the LR system include: increases in target location accuracy provided by the Laser Range Finder/ Digital Compass Assembly (LRF/DCA) and the Global Position System (GPS); improvement in night operations afforded by a night vision equipment, and the ability to rapidly exchange accurate surveillance data on enemy positions, target locations and enhanced command and control between the soldiers, squad and Command Center(s). All of the above is accomplished while enhancing the soldier's mobility, sustainment and survivability.

BRIEF DESCRIPTION OF THE DRAWINGS

FIG. 4 is a side view of the Integrated Helmet Assembly Subsystem and laser detection system mounts in accordance with the present invention.

FIG. 4a is a perspective view of a keyboard and hand-held display in accordance with the present invention.

FIG. 5 illustrates the Weapon Subsystem in accordance with the present invention.

DETAILED DESCRIPTION

Figure 1:
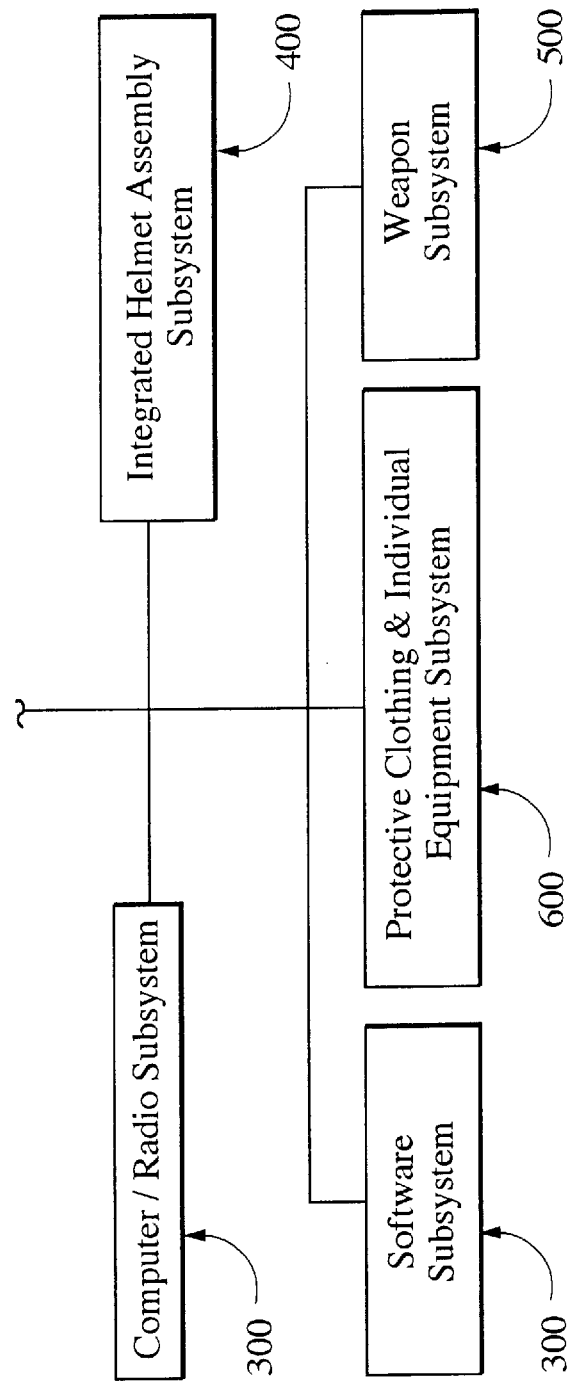
FIG. 1 is a block diagram of the Land Warrior (LW) system.

The LW system 100, as shown in FIG. 1, is generally comprised of multiple modular components to increase combat effectiveness, situational awareness, and survivability of the LW on the battlefield. In a preferred embodiment, the LW system 100 of the present invention consists of five major subsystems, (1) a Computer/Radio Subsystem (CRS) 200, (2) a Weapons Subsystem (WS) 500, (3) an Integrated Helmet Assembly Subsystem (IHAS) 400, (4) a Protective Clothing and Individual Equipment Subsystem (PCIES) 600, and (5) a Software Subsystem 300.

(1) Computer/Radio Subsystem 200

The Computer/Radio Subsystem (CRS) 200 provides the focal point for integration of the various peripheral systems and the computing resources required to collect, consolidate, and manipulate data for display to the soldier. The computer/radio subsystem 200 also includes the primary control interface for the soldier to control the various subsystems.

Figure 3:
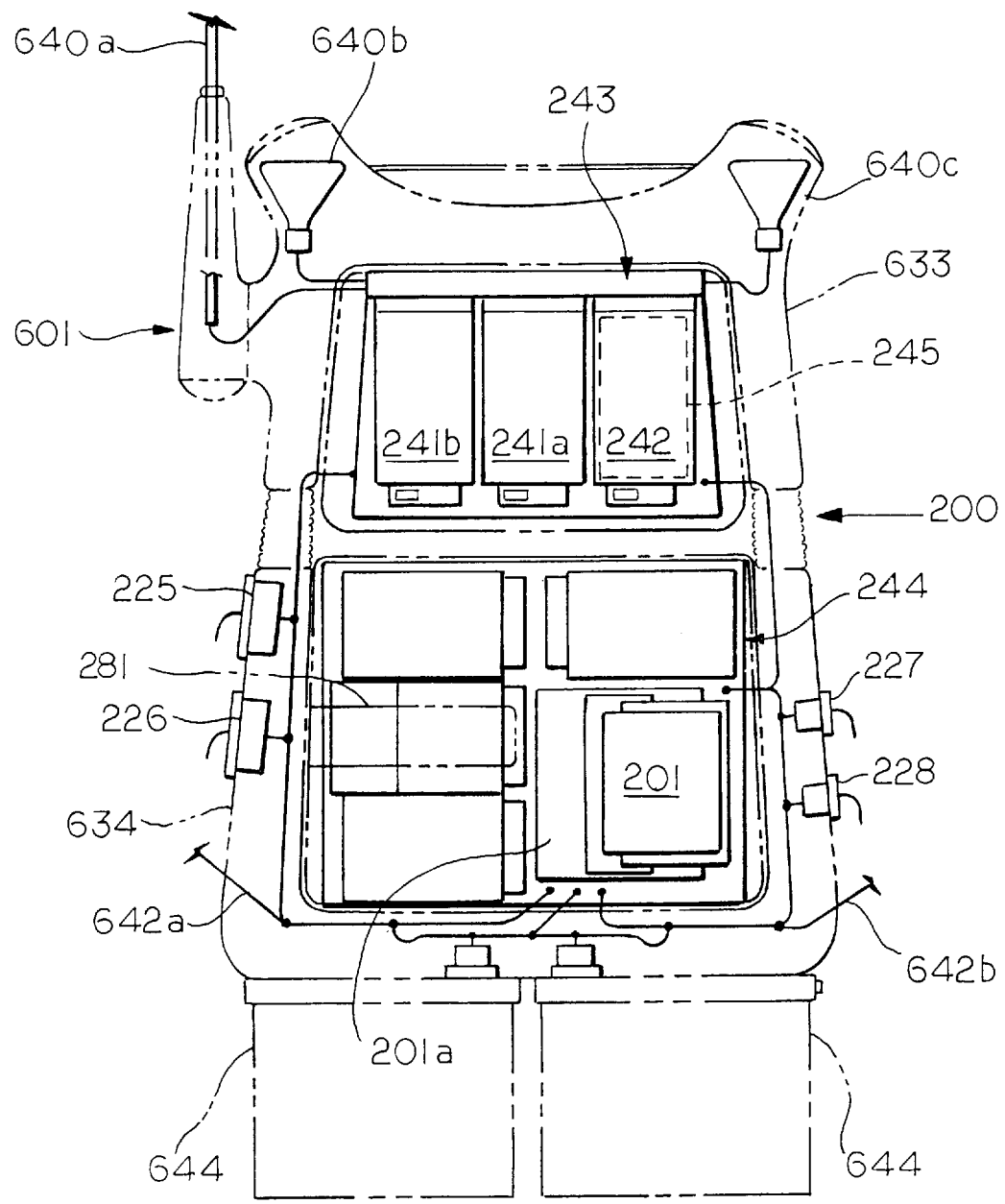
FIG. 3 is a sectional view of the integrated load carrying equipment (LCE) and Computer/Radio Subsystem (CRS).

Referring now to FIG. 3, the computer/radio subsystem 200 is attached within the lower frame module 634 of the load carrying equipment (LCE) 601. When the LCE 601 is worn by the soldier, similar to a backpack, the computer/radio subsystem 200 remains positioned in the lower lumbar region of the soldier where it lowers the center of gravity. This avoids stressing the soldier's spine. This LCE 601 houses the main power batteries 644 and wire harnesses and its connectors avoiding any loose cabling that could snag in the field.

The computer/radio subsystem 200 is integrated with the LCE 601 frame-work. Each of the major computer/radio subsystem sub-assemblies are in a separate environmentally sealed unit. The major components to the computer/radio subsystem 200 include the squad radio 241a, soldier radio 241b, computer 201a, Information Security (INFOSEC) module 242, and Global Positioning System receiver (GPS) 245. The computer 201a use Personal Computer Memory card International Association (PCMCIA) technology and standard low power components, such as a 486 computer card, removable and non-removable memory cards, video card, and standard I/O interface cards, to support upgrades to the computer system. The main processor utilizes a standard ISA PC bus to communicate with the various computer components. The computer/radio subsystem 200 via Personal Computer Memory Card International Association (PCMCIA) video technology and the high level main processors, provides video processing capabilities. The video processing capability of the computer 201a allows the soldier to create, modify, and store graphics information from the thermal weapons sight 525, and video camera 535 (shown in FIG. 5). The thermal weapons sight 525, and video camera 535, when it is used in conjunction with the laser range finder/digital compass assembly (LR/DCA) 530, allows for target identification and engagement at longer ranges under more adverse conditions, and with increased firing precision.

External interfaces (type RS232 connectors well known in the art 225, Remote Radio Control 226, type DS101 connectors 228 well known in the art, etc.) are located along the sides of the LCE frame 601 for easy access. These connectors are recessed within the frame to prevent damage and may be covered when not in use. The radio module 243, computer module 244, the global positioning antenna 640c the soldier radio antenna 640b, and the squad radio antenna 640a are contained within the protective envelope of the LCE 601 to minimize interference with the soldiers movements. The global positioning 640c and soldier radio 640b antennas are preferably conical spiral dipole with a relatively narrow band, attenuating out of band interference from the squad radio antenna 640a. The conical shape of the antennas provide a hemispherical pattern coverage for all position use, low profile and superior axial ratio performance at low elevation angles. Both of these antennas are circularly polarized, each with opposite polarization to help minimize interference. In addition, the spiral dipole provides directivity to help minimize pattern distortion due to the soldier and pack load. For the squad radio 241a, a longer "whip" style antenna is preferable to attain a communication range of approximately five kilometers. The squad radio antenna 640a is a flexible dipole type approximately three feet in length. Shielding of cables and enclosures ensures compatibility between the operation of the radios 241a, 241b, global positioning receiver 245 and the computer 201a.

The computer/radio subsystem 200 provides all of the communications resources for the LW system 100. These include standard push-to-talk voice and voice activated (hands-free) communications, text messages, and video image transfers. In addition to point-to-point voice and data communications, the LW system 100 is capable of providing, by means of a squad radio 241a, connectivity and protocol management for standard military VHF radio nets.

The computer/radio subsystem 200 is designed with a central ISA Bus high level computer 201a. Illustrated in FIG. 5, the Remote Input Pointing Device (RIPD) 250, weapons subsystem 500, and thermal Weapons Sight (TWS) 525 interface directly with the main processor assembly 201 in the computer 201a. The RIPD 250, which includes a pressure sensitive touch pad 250a for cursor movement, select key, escape key, and radio controls, is the primary user input device used by the soldier to activate controls (i.e., select control, escape control, soldier radio push-to-talk control, squad radio push-to-talk control, soldier radio volume control, squad radio volume control), manipulate graphics, and select menu options through windows displayed on the heads-up display of the LW system 100.

Video displays and video processing functions are provided by a PCMCIA video assembly in the computer module 244. Command and control messages, stored images, maps, and text data are transferred by the computer 244 over the PCMCIA interface. The PCMCIA video assembly provides a standard VGA output to the Integrated Helmet Assembly Subsystem (IHAS) 400 and keyboard/hand-held display 260 (shown in FIG. 4a). In addition to stored images, the PCMCIA video assembly outputs live video displays from the video camera 535 or thermal weapon system 525. The PCMCIA video assembly provides for image capture from the video camera 535 or thermal weapon system 525, and image compression/decompression for captured or stored images.

Communications, under the control of the computer module 244, are supported by the soldier radio 241b, the squad radio 241a (when present) and via the interface connector 226 to an external radio. The soldier radio 241b provides voice and data communications between squad members. The soldier radio 241b, utilizes an M16QAM digital waveform and readily accepts voice or digital data. In its normal mode of operation, all data on the soldier radio network is encrypted by our information security assembly 242. An audio amplifier-I/O processor in the computer module 244 monitors the radio controls on the RIPD 250, provides voice digitalization and reconstruction for secure voice modes, routes voice and data to the respective radios, and manages the control interface to the radios. The information security assembly (INFOSEC) 242 provides two separate isolated paths for data encryption. The path to the squad radio 241a provides hardware based Type I encryption, while the path to the soldier radio 241b uses a software based Type III encryption algorithm.

In its default mode (i.e., computer failure), the soldier radio 241b operates in voice only on a preassigned default frequency channel. The RIPD 250, is the primary input interface between the soldier and the LW system 100. The RIPD 250 may be worn on either the soldier's right or left side depending on the soldier needs and preferences. The controls are located for ease of access and sized for use with gloves. In addition, the radio volume control on the RIPD 250 remains active in the event of computer failure.

The integrated global positioning receiver 245 is controlled through an RS232 standard interface that is part of the I/O processor in the computer module 244. The global positioning receiver 245 provides accurate position information (latitude, longitude, elevation) based on a user selected grid reference system and in a variety of formats. The soldier utilizes the global positioning information for providing/displaying own position, location of squad members and other units, and navigation way-point information.

In addition, the Global positioning receiver 245 output includes very precise time-of-day information (within approx. ±100 ns) to be used for maintaining network timing, information security 242 timing, external ground/airborne radio timing connected via port 226, and providing precise updates for the computer 201a real time clock. Time information for the information security 242 and radio management functions is a direct input from the global positioning receiver 245 to enable those functions to continue in the event of computer failure.

Power for the computer/radio subsystem 200 is provided by the Power converter/Power Management Module in the computer module 244. Except for the memory hold battery, all power for the computer/radio subsystem 200 is supplied by the main batteries 644. Power within the computer/radio subsystem 200 is distributed primarily by means of the PCMCIA bus. Other assemblies receive power directly from the Power Management assembly. The Power Management assembly has complete control over the individual cards attached to the PCMCIA bus and the assemblies receiving power directly from the Power Converter. This forms the primary level of power management within the computer/radio subsystem 200. In addition, the computer 201a, the soldier radio 241b, squad radio 241a, and global positioning receiver 245 perform additional power control based on their operating mode and usage, providing a secondary level of power management for the computer/radio subsystem 200.

(2) Weapons Subsystem 500

The LW system 100 integrates the soldier, a modular weapon 536 (M16A2E4, M4E2, etc.) and the Weapon Subsystem (WS) 500 into a combat system capable of operating during the day, at night, and under a variety of combat conditions.

Figure 2:
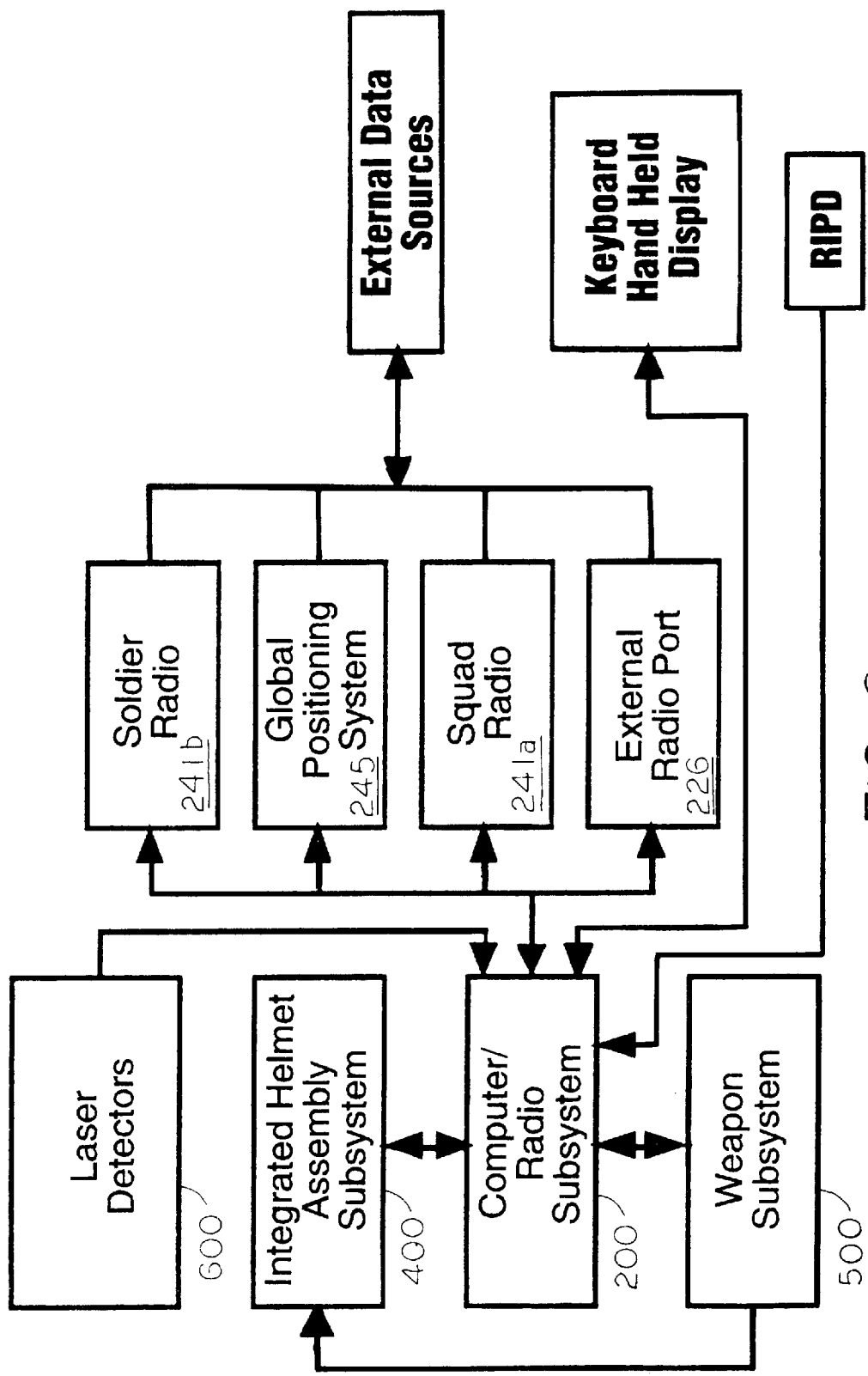
FIG. 2 schematically illustrates data flow between the Land Warrior Subsystems and interfacing external systems.

As shown in FIGS. 2 and 5, the weapon subsystem 500 is integrated with the computer/radio subsystem 200, and the integrated helmet assembly subsystem 400 to form one complete system that enables the soldier to fully utilize the capabilities of all of the subsystems. The weapon subsystem 500 includes a modular weapon 536, a thermal weapon sight (TWS) 525, video camera 535 and laser range finder/digital compass assembly 530 operably connected to the modular weapon 536, and infrared aim light 537 (FIG. 5). The video camera 535 conveys imagery and the laser range finder/ digital compass assembly 530 conveys range, azimuth, and elevation data pertaining to a chosen target for processing by the weapon subsystem 500. The imagery from the thermal weapon sight 525 or video camera 535, and laser range finder/digital compass assembly 530 data may be viewed directly on the integrated helmet assembly subsystem heads-up display 432 (FIG. 4), eliminating the soldier's dependence on weapon mounted displays. This information can also be transmitted to other squad members and commanders using the computer/radio subsystem 200 communication capabilities.

As shown in FIG. 5, the weapon segment harness 970 of a type well known in the art connects the weapon subsystem 500 to the soldier, integrated helmet assembly subsystem 400, and to the computer/radio subsystem 200 via a junction block 925. In a preferred embodiment, the wire harness 970 is a small diameter cable that is coiled to avoid interference with the soldier when the soldier is in the prone position, moving through brush or tight spaces, or in an overhead or around a corner firing/surveillance position. The sensor segment of the wire harness 980 may be hinged to allow opening of the modular weapon 536 without interference. The wire harness 970 may be formed of a molded silicon with embedded conductors and shields installed into an exterior shell. The shell provides environmental protection and structure for the harness and may be made of injection molded, glass filled, nylon which supplies adequate support while providing the required flexibility for adaption to the weapon 536.

The harness 970 snaps and screws onto the modular weapon 536 and quickly interconnects the laser range finder/ digital compass assembly 530, thermal weapon sight 525, the infrared aiming light 537, and remote computer controls 550 mounted for either left or right handed users. The remote computer control pad 550 is located above the trigger of the modular weapon 536. The control pad 550 is positioned to allow a soldier to steady and aim the modular weapon 536 and use the features and advantages of the LW system 100 without either removing their hands from the firing position to adjust controls or taking their eyes off the chosen target.

The weapon subsystem 500 also affords the soldier the advantage of being able to survey the battlefield from concealed positions using the video camera 535 and thermal weapon sight 525 as the viewing device while only exposing their hands and their weapon to potential enemy fire. The magnification and high resolution of the video camera 535 and thermal weapon sight S25 provides high quality images that can be viewed on the integrated helmet assembly subsystem 400, stored in the computer/radio subsystem 200, and transmitted back to command for effective reconnaissance.

It is a feature of the weapon subsystem 500 that the modular nature of the weapon subsystem 500 ensure that the weapon subsystem 500 can be easily reconfigured to meet a wide variety of mission needs. All components are rail mounted along the weapon 536 and can be removed or repositioned along the rail. Reliability is maximized to ensure availability, and power is closely managed to extend useful mission life. Survivability of the soldier is improved by using the weapon mounted thermal weapon sight 525 and video camera 535 to survey the battlefield from cover. moreover, no light (visual or near infrared) is emitted from the weapon subsystem 500 without the knowledge of the soldier, eliminating accidental visual signatures that would reveal the soldier's position.

Lethality is augmented by supplying a laser range finder and digital compass 530 to pinpoint exact target locations for accurate direct and indirect fire. The high magnification of both the video camera 535 and thermal weapon sight 525 enhances the soldier's surveillance and target acquisition capabilities.

The weapon subsystem 500 is designed to interface with the soldier to provide rapid operation, ease of use, and maximum utility and effectiveness. The laser range finder/ digital compass assembly 530, thermal weapon sight 525, and infrared aiming light 537 are powered by separate integral batteries (not shown) of a type well known in the art and may be quickly accessed and changed in seconds. The laser range finder/digital compass assembly 530 may be powered by the LW batteries 644 in an alternate embodiment.

In operation, after the soldier acquires a target using the thermal or day sights, the laser range finder/digital compass assembly 530 operates as a fully functional, standalone unit. Neither the entire computer system 200 nor the heads-up display 432 are needed to use the laser range finder/digital compass assembly 530. The laser range finder/digital compass assembly 530 display is clearly visible yet it is small enough not to obstruct peripheral vision when the soldier positions their cheek on the weapon stock for aiming. The laser range finder/digital compass assembly 530 controls are positioned within finger reach when the soldier is in any aiming position. Interfacing the laser range finder/digital compass assembly 530 with the weapon wire harness 970, and the computer/radio subsystem 200, allows the system to operate from any of three completely independent and redundant controls including using keypad located on the laser range finder/digital compass assembly 530, using the on-weapon computer/radio subsystem control switches 550, located near the trigger of the weapon or using the remote input pointing device 250 located on the front of the soldier.

The components forming the weapon subsystem 500 are of a type commercially available. For example, the laser range finder 530 may be a mini laser rangefinder commercially available from Fibertek. The laser range finder 530 may be repackaged and ruggedized as required to improve resistance to weapon fire shock. Similarly, the video camera 535 may be most any suitable commercially available high performance camera. The various components of the weapon subsystem 500 are designed to comply with EMI, EMC, and HEMP requirements.

(3) Integrated Helmet Assembly Subsystem 400

Turning now to FIGS. 2 and 4, there is shown a Land Warrior Integrated Helmet Assembly Subsystem (IHAS) 400 including an integrated ballistic helmet shell 402 incorporating a stable suspension and sighting platform, sensor/ display assembly 432 for day-night sighting and data acquisition, laser detectors 408, 410 for threat warning, and an audio headset assembly 450 providing complete communications capability.

The audio headset assembly 450 attaches to either side of the helmet 402 with velcro and connects to the computer/radio subsystem 200 via a mini-plug in the helmet liner. The audio headset assembly 450 permits soldier-to-soldier and squad leader-to-platoon higher echelon communication. The audio headset assembly 450 has integrated a lightweight electric boom microphone, and speaker onto the helmet suspension system to provide the LW with a hands-free communication capability.

A helmet mount 441 at the front-center of the helmet 402 allows either day or night heads-up displays 440, 445 to be attached. The sensor/display assembly 432 operates either in a stand alone mode, directly connected to the thermal weapon sight 525 or video camera 535, or in conjunction with the computer/radio system 200 as the connection with various video, graphical, and symbolic information sources.

The sensor/display assembly 432 provides video information through the day or night heads-up display 440, 445 to the soldier to allow target acquisition and detection, target range determination, soldier location determination, or other computer generated digitized battlefield information required by the soldier. An Active Matrix Electroluminescent (AMEL) panel of a conventional design housed in the day and night heads-up display 440, 445 are driven by a common display drive electronics module 425 mounted on the rear of the helmet.

Power for the night and day heads-up displays 440, 445 electronics is received from the main battery 644 (FIG. 3). The brightness and contrast controls for the night and day heads-up displays 440, 445 are conveniently located on a torso-mounted junction block 925 attached to the soldier's left/right harness in the soldier's chest area. The monocular helmet mounted heads-up display 440, 445 automatically turns off when flipped up so as not to impede normal vision and to maintain light security.

The Integrated helmet assembly subsystem wiring harness 430 has an environmentally protected quick-disconnect to the Land Warrior subsystem interface junction block 925.

(4) Protective Clothing/Individual Equipment Subsystem 600

The Protective Clothing and Individual Equipment Subsystem (PCIES) 600 provides the soldier with protection from battlefield hazards (environmental/ballistics/lasers), the ability to carry combat equipment, and easily maneuver in the battlefield.

As shown in FIGS. 4 and 6–8, the protective clothing and individual equipment subsystem 600 generally consist of a body armor 719, a load carrying equipment (LCE) 601, a armor vest 721, modular packs 654, and laser detectors 408, 410.

The body armor 719 (FIG. 7–8) includes shoulder pads 725, and a soft armor vest 721 with flaps 722 and 723 for easy don/doff and medical access. The side opening design formed by flaps 722 and 723 allows for ventilation and heat stress reduction when the vest is worn open in noncombat situations. The aide opening 723 also provides easy access to battlefield uniform pockets. The vest 721 also includes a side opening front plate pocket 720. A ballistic plate 719 may be slid in and out of the side opening pocket 720 for increased protection. A side opening pocket may also be placed in the back (not shown) of the vest 721 for additional ballistic protection.

A substantial benefit of the side opening body armor 719 is that ventilation is achieved and heat stress reduced when the vest is worn open while maintaining protection of the front and back of the soldier's torso via the plate 719. A detachable groin protector 724 can also be added to the body armor 719. The materials forming the body armor 719 are of a type commercially available.

Figure 6:
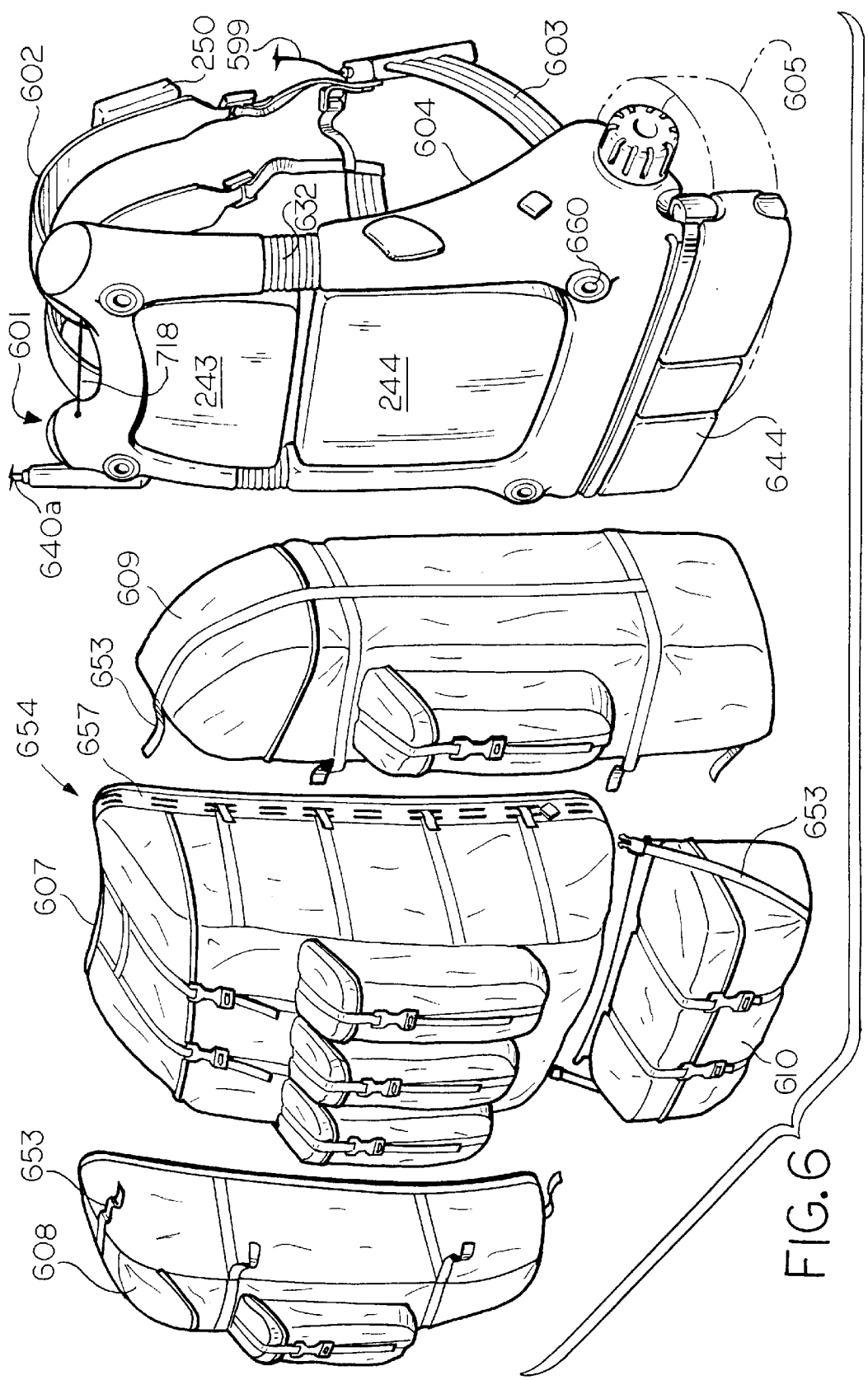
FIG. 6 is an exploded isometric view of the load carrying equipment (LCE) and pack load modules.
Figures 7, 8:
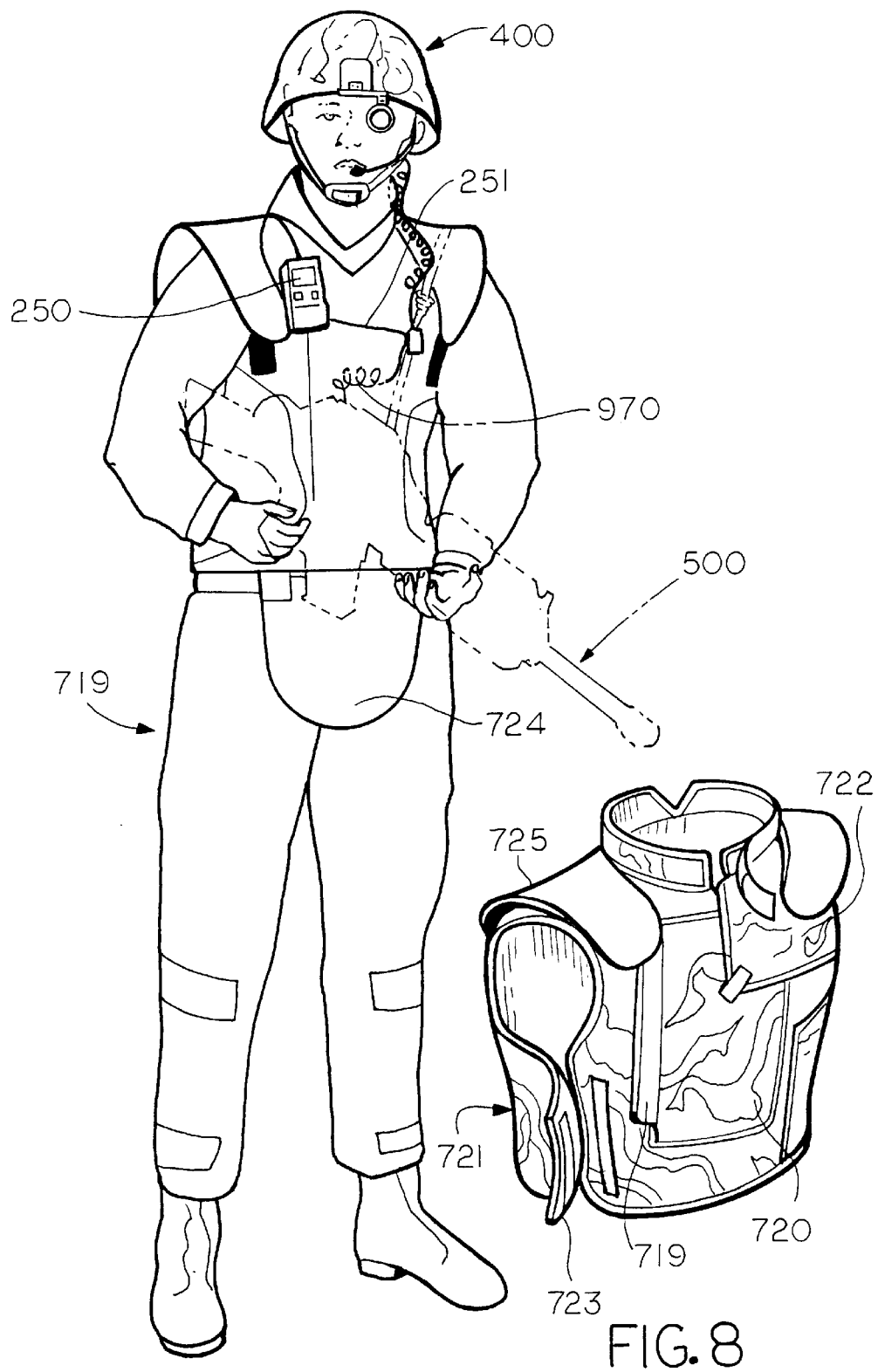
FIG. 7 illustrates the Land Warrior full body armor system in accordance with the present invention.
FIG. 8 is a perspective view of the Land Warrior body armor vest showing a hard armor plate for additional ballistic protection in accordance with the present invention.

The LW body armor 719 is functionally integrated with the LCE 601 (FIG. 6) through the incorporation of a ballistic belt 605. The belt 605 fits snugly under the vest 721 to provide complete coverage to all vital organs. As shown in FIG. 6, the LCE 601 includes a low profile, body contoured, pack frame 604 that is specifically designed to increase soldier agility and reduce physical fatigue. The pack frame 604 incorporates flex joints 632 in the vertical sections of the pack frame 604 separating the computer nodule 244 and the radio module 243. The flex joint 632 extends the soldier's level of comfort and range of motion. The computer module 244 and radio module 243 are supported between the vertical sections of the pack frame 604.

The pack frame 604 also provides the platform for the antennae (640a, 640b, 640c) and batteries 644. The pack frame 604 vertical supports are hollow to provide an enclosed chamber for wire routing. The wires within the pack frame 604 can extend from the inside of the pack frame 604 and through the LCE rib-cage straps 603. The ends of the rib-cage straps 603 may include environmentally sealed electrical connectors for mating with the integrated helmet assembly subsystem 400, weapon subsystem 500, RIPD 250, and keyboard and hand-held display 260 (FIG. 4a). Integrating the wiring harness within the LCE 601 prevents wire snagging and provides enhanced mobility.

The LCE 601 also incorporated quickly doffed modular packs 654. Modular packs 654 includes approach pack 607, sustainment packs 608, 609, and assault pack 610. The modular packs 654 may be carried by the pack frame 604 in various combinations to allow the soldier to tailor the load to the specific Mission, or carry other equipment with compatible mounting studs.

The modular packs 654 may be quickly removed from the pack frame 604 by way of a quick release coupling mechanism within attachment points 660. In a preferred embodiment, approach pack 607 include mounting studs (not shown) extending outwardly from the approach pack backplane 657. The studs on approach pack 607 mate with attachment points 660 and lock therein. The sustainment packs 608, 609 may be attached to the approach pack 607 and the assault pack may be either attached to the approach pack 607 or directly to the bottom of the pack frame 604 via straps 653. The approach pack 607, and those packs attached thereto, may be removed from the pack frame 604 via the release coupling mechanism within attachment points 660 by pulling on the handle 718 at the top of the pack frame 604.

The final component of the protective clothing and individual equipment subsystem 600, is the laser detectors 608, 610, mounted into a the integrated helmet assembly subsystem brackets 441, 425 to protect the sensors and to ensure modularity. The laser detectors 408, 410 may include an array of four sensors optimally placed to provide full 360 degree coverage and individual quadrant warning of laser threat energy. The detectors provide alert notification of the type of threat and the quadrant direction of the laser threat through an aural signal to the earphone 455 and visual signals through the heads-up display 432.

Detection information is passed electrically to the computer/radio subsystem 200, where the information is processed for risk and quadrant determination. (5) Software Subsystem 300

The computer/radio subsystem 200 is designed in conjunction with the Software Subsystem (SS) 300. User memory cards are accessed by opening a protective cover 281, and the cards may be inserted into the computer module 244 compartment in any order. All of the user cards are keyed to prevent insertion in the reverse direction.

The software subsystem 300 includes the programs and operating instructions which interconnect the hardware of the LW system 100 and allow the hardware, e.g., computer/radio platform and its external devices, to communicate and share information. The software is of a commercially available type well known in the art adapted to facilitate the performance of the required function of the LW system 100.

The software subsystem 300 may be considered as including three separate software configurations, an applications configuration, system configuration, mission data support configuration.

The application configuration focuses on the requirements of the LW mission. It utilizes general functions in the system configuration to provide control of various battle functions (location/navigation, map display, location database, laser detection warning, graphics display), manage the visual displays (program control, display manager), utility functions (video image processing, word processor function, event timers), mission equipment and supply (inventory tracking, planning and reporting), and performance enhancement (self-contained user training, reference data).

The system configuration contains the general purpose graphic tool boxes upon which the graphic user interface is constructed. The system configuration provides control of communications, equipment operation, work station operation, data services, user interface and operating system. communications control encapsulates the complexity of the communications interfaces to simplify application configuration software code and avoid duplication and provide connectivity throughout the LW system 100 and the digitized battlefield. The equipment manager contains all of the equipment unique codes and provides a general interface to other units that do not change if the equipment changes. The equipment manager permits soldier control over the equipment through the LW control panel. The work station operation contains all start-up and configuration code, i.e., initialization, access control, so that all other functions can focus on main processing. The data services of the system configuration includes such tools as list manager, coordinate conversion, table manager and sketching tool. The user interface includes a voice interface, help and the like. The system configuration manages a set of data and devices to insulate the application configuration from any input changes to the data formats or device characteristics.

The mission data support configuration provides control of mission planning, mission analysis, user interface, mission data utilities and mission data support.

The software subsystem 300 is configured so that the software associated with each subsystem is unrelated to the main function of the operation of the LW system 100 and is self-contained for a particular subsystem. Accordingly, by reducing the interdependence of the software additional functions may be added to the software package by merely replacing a particular software package with a new software package.

The mission data support configuration prepares the movable mission data modules for use in the LW system 100 and reads data from mission log modules generated during LW operation.

In a preferred embodiment the software is associated with each module to allow the portability and interchangeability of the various modules forming the LW system.

INTERFACE

Electrical interfaces between the four Land Warrior hardware subsystems provides an integrated compact electrical connection between the subsystems. A wire harness torso segment links the computer/radio subsystem 200 with the remote input pointing device 250, main battery 644, and soldier, squad and global positioning unit antennas 640b, 640a, 640c. The torso segment is completely integrated with the load carrying equipment 601 to minimize snagging, tangling, maximize strength, and provide shielding/environmental protection. A keyboard 260a and a hand-held display 260b share a common interface with the remote input pointing device 250 to simplify their connection to the computer/radio subsystem 200 without removal of the load carrying equipment 601 via the junction block 925. The weapon and sensor wire harness segments 970, 980 provide connectivity between the computer/radio subsystem 200 and the laser range finder/digital compass assembly 530, video camera 535, thermal weapon sight 525, weapon mounted computer controls 550 and the infrared aiming light 537.

Digital signals for remote operation of the laser range finder/digital compass assembly 530 and thermal weapon system 525; RS 170 signals (of the type well known in the art) from the video camera 535 and thermal weapon system 525, remote activation of the infrared aim light 537, and power to the c 535 are routed through the weapon/sensor wiring harness 970, 980 segment. The integrated helmet assembly subsystem 400 segment of the wiring harness provides connectivity from the computer/radio subsystem 200 to the sensor display assemblies 432, headset 450, and laser detectors 408, 410. Power (±5, +7, −3 Vdc & 200 VAC), video (VGA/RS-170 of the type well known in the art), control signals and headset audio comprise the integrated helmet assembly subsystem 400 interface.

In addition, laser detector power, event detection and amplitude signals are also routed through the Integrated helmet assembly subsystem segment 400. In the event of a computer/radio failure, RS-170 signals from the thermal weapon system 525 or video camera 535, can be routed to the head mounted display electronics 432. This is accomplished via coaxial switches within the junction block 925.

Also included in the interface of the LW system 100 is the soldier interface with all the subsystem and component parts. To assist the soldier in organizing the enormous volume of available information and function, there is provided a graphical user interface (GUI) which is a software based, hardware implemented system. The graphical user interface controls the flow of data to provide the soldier with only the information needed to increase his lethality and survivability in combat, without introducing cognitive overload.

The LW system graphical user interface (GUI) consists of icon-based visual control and information screens that the soldier views on the integrated helmet assembly subsystem 400 or hand-held display 260b and manipulates the information with the remote input and positioning device 250.

The graphical user interface provides the soldier with a simple, intuitive method of controlling the many features of the LW system 100. The remote input and pointing device 250 provides omnidirectional control via a touch pad 250a of an easy to follow graphical user interface cursor, which is used to select simple pictorial icons representing operation options. The graphical user interface includes access to tactical data including digitized battlefield information, electronic range cards, video imaging, radio control, electronic message generation and reception, and inventory status. It also provides utilities such as word processing, file management and graphics manipulation.

Graphical user interface information is typically viewed through the day/night heads-up displays 440, 445 in an uncluttered, easy-to-read format. The helmet mounted display provides high-resolution, hands-free viewing of displays. This includes targeting data from the laser range finder/digital compass assembly 530 or thermal weapon system 525 and crucial tactical positioning facts. In addition to the normal visual presentation of information, aural announcements are made through the integrated helmet assembly subsystem headphone 455.

It will appreciated that although the present invention has been described with reference to the soldier and the art of war, the present invention is equally applicable to law enforcement personnel.

What is claimed is:

1. An integrated man-portable modular system capable of providing a soldier with real-time situational awareness and communications capability, the modular systems comprising:
    a plurality of reconfigurable modular subsystems for providing said real-time situational awareness and said communications capability, wherein said modular subsystems include an integrated helmet assembly subsystem (IHAS), a computer/radio subsystem (CRS), a weapon subsystem (WE), a protective clothing and individual equipment subsystem (PCIES), and a software subsystem (SS);
    a load carrying equipment for carrying said subsystems by the soldier as an integrated unit and facilitating flow of information between said subsystems and the soldier; and
    a data control device for operatively processing and controlling flow of information between said subsystems and the soldier.

2. The modular system of claim 1 wherein said modular subsystems provide enhanced ballistic protection, threat detection, field-of-vision, inter-communication, navigation and weapon control.

3. The modular system of claim 1 wherein said integrated helmet assembly subsystem includes an integrated heads-up display for displaying information processed by said data control device.

4. The modular system of claim 3 wherein said integrated helmet assembly subsystem includes a helmet for mounting said heads-up display and having an audio headset assembly for transmitting and receiving audio communications.

5. The modular system of claim 4 wherein said helmet includes a plurality of sensors for detecting a laser threat to the soldier.

6. The modular system of claim 1 further comprising a global positioning system operatively connected to said data control device, said global positioning system capable of processing information related to a position of said modular system and displaying said position on a heads-up display.

7. The modular system of claim 1 wherein said data control device includes a plug-in, plug-out circuit card architecture.

8. The modular system of claim 1 wherein said computer/radio subsystem includes a plurality of individuals radios providing voice and data communication between soldiers.

9. The modular system of claim 1 wherein said Weapon Subsystem includes a modular weapon having a thermal weapon sight, video camera, laser range finder and digital compass assembly operably connected to said modular weapon.

10. The modular system of claim 9 wherein said thermal weapon sight, video camera, laser range finder and digital compass assembly sense information and transmit said sensed information to said data control device for processing and display of said sensed information on a heads-up display.

11. The modular system of claim 1 wherein said Protective Clothing and Individual Equipment Subsystem includes ballistic protection armor worn by the soldier.

12. The modular system of claim 11 wherein said ballistic protection armor includes an armor vest having a ballistic plate mounted within a front plate pocket of said armor vest and ballistic plate mounted within a rear plate pocket of said armor vest for ballistic protection.

13. The nodular system of claim 1 wherein said load carrying equipment includes a frame and a plurality of individual load packs for carrying equipment, said frame having a quick release mechanism for doffing said load packs from said frame.

14. An integrated man-portable modular system capable of providing a soldier with real-time situational awareness and communications capability, the modular system comprising:
    a plurality of reconfigurable modular subsystems for providing said real-time situational awareness and said communications capability, wherein said modular subsystems include an Integrated Helmet Assembly Subsystem (IHAS), a Computer/Radio Subsystem (CRS), a Weapon Subsystem (WS), a Protective Clothing and Individual Equipment Subsystem (PCIES), and a Software Subsystem (SS);
    a load carrying equipment for carrying said subsystems by the soldier as an integrated unit and facilitating flow of information between said subsystems and the soldier; and
    a data control device for operatively processing and controlling flow of information between said subsystems and the soldier, said data control device having a plug-in, plug-out circuit card architecture.

15. The modular system of claim 14 wherein said integrated helmet assembly subsystem includes an integrated heads-up display for displaying information processed by said data control device.

16. The modular system of claim 15 wherein said integrated helmet assembly subsystem includes a helmet for mounting said heads-up display and having an audio headset assembly for transmitting and receiving audio communications.

17. The modular system of claim 15 wherein said integrated assembly helmet includes a plurality of sensors for detecting a laser threat to the soldier.

18. The modular system of claim is 14 further comprising a global positioning system operatively connected to said data control device, said global positioning system capable of processing information related to a position of said modular system and displaying said position on a heads-up display.

* * * * *